(12) United States Patent
Zafar et al.

(10) Patent No.: US 8,751,672 B2
(45) Date of Patent: Jun. 10, 2014

(54) PERSONAL VIDEO CHANNELS

(75) Inventors: Shadman Zafar, Coppell, TX (US); Ruchir Rodrigues, Irving, TX (US); Shafiq Kassam, Lewisville, TX (US); Enrique Ruiz-Velasco, Flower Mound, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 992 days.

(21) Appl. No.: 11/471,674

(22) Filed: Jun. 21, 2006

(65) Prior Publication Data

US 2007/0299976 A1     Dec. 27, 2007

(51) Int. Cl.
| | |
|---|---|
| G06F 15/16 | (2006.01) |
| H04N 5/445 | (2011.01) |
| H04N 7/173 | (2011.01) |
| H04L 29/06 | (2006.01) |
| H04L 29/08 | (2006.01) |
| H04L 12/28 | (2006.01) |
| H04L 9/32 | (2006.01) |

(52) U.S. Cl.
CPC ......... H04L 65/4076 (2013.01); *H04L 65/4084* (2013.01); *H04L 67/104* (2013.01); *H04L 67/325* (2013.10); *H04L 67/327* (2013.01); *H04L 69/14* (2013.01); *H04L 12/2834* (2013.01); *H04L 29/06027* (2013.01); *H04L 9/3215* (2013.01)
USPC ........... 709/229; 709/227; 709/228; 709/231; 725/45; 725/95; 725/100; 725/120; 725/135

(58) Field of Classification Search
CPC ............ H04L 65/4076; H04L 65/4084; H04L 67/104; H04L 67/325; H04L 67/327; H04L 69/14; H04L 12/2834; H04L 29/06027
USPC ........ 709/227, 228, 229, 231; 725/37, 39, 44, 725/45–47, 87, 95, 97, 100, 101, 105, 133, 725/141, 153, 86, 120, 135
See application file for complete search history.

(56) References Cited

U.S. PATENT DOCUMENTS 5,534,911 A * 7/1996 Levitan ........................... 725/46
5,798,785 A * 8/1998 Hendricks et al. .............. 725/46
(Continued)

FOREIGN PATENT DOCUMENTS

CN          1227457 A    9/1999

OTHER PUBLICATIONS

Apple—MAC OS X—Quicktime 7, 2005, 3 pages, Apple Computer, Inc., downloaded from http://www.apple.com/macosx/features/quicktime on Jun. 22, 2005.

(Continued)

*Primary Examiner* — Emmanuel L Moise
*Assistant Examiner* — Farzana Huq

(57) ABSTRACT

Systems and methods provide personal channels from a network-capable user terminal. A first user terminal may receive a request from a second user terminal for access to a personal channel created by a user and stored on the first user terminal in association with media content. In response to the request, the first user terminal may access the media content associated with the requested personal channel and provide the media content to the first user terminal over the network. A data center accessible by both the first and second user terminals may facilitate the access to the personal channel by storing information associated with the personal channel, including terminal identifiers and metadata, and providing a searchable catalog interface to identify personal channels to view.

20 Claims, 10 Drawing Sheets

(56) References Cited

U.S. PATENT DOCUMENTS

| | | | |
|---|---|---|---|
| 5,956,716 A * | 9/1999 | Kenner et al. | 707/10 |
| 6,211,901 B1 * | 4/2001 | Imajima et al. | 725/93 |
| 6,324,338 B1 * | 11/2001 | Wood et al. | 386/83 |
| 6,486,920 B2 * | 11/2002 | Arai et al. | 348/563 |
| 6,675,205 B2 | 1/2004 | Meadway et al. | |
| 6,694,316 B1 * | 2/2004 | Langseth et al. | 707/10 |
| 6,772,147 B2 * | 8/2004 | Wang | 707/3 |
| 6,774,926 B1 * | 8/2004 | Ellis et al. | 348/14.01 |
| 6,947,973 B2 * | 9/2005 | Shimura et al. | 709/217 |
| 7,103,905 B2 * | 9/2006 | Novak | 725/46 |
| 7,320,025 B1 * | 1/2008 | Steinberg et al. | 709/217 |
| 2001/0003845 A1 * | 6/2001 | Tsukamoto et al. | 725/8 |
| 2002/0104099 A1 * | 8/2002 | Novak | 725/136 |
| 2002/0144283 A1 * | 10/2002 | Headings et al. | 725/109 |
| 2002/0154892 A1 * | 10/2002 | Hoshen et al. | 386/87 |
| 2004/0068524 A1 * | 4/2004 | Aboulhosn et al. | 707/200 |
| 2004/0110436 A1 * | 6/2004 | Smith | 441/61 |
| 2004/0117842 A1 * | 6/2004 | Karaoguz et al. | 725/105 |
| 2004/0128693 A1 * | 7/2004 | Weigand | 725/95 |
| 2004/0163127 A1 * | 8/2004 | Karaoguz et al. | 725/120 |
| 2005/0028208 A1 * | 2/2005 | Ellis et al. | 725/58 |
| 2005/0246732 A1 * | 11/2005 | Dudkiewicz et al. | 725/13 |
| 2006/0123455 A1 * | 6/2006 | Pai et al. | 725/133 |
| 2007/0199019 A1 * | 8/2007 | Angiolillo et al. | 725/39 |

OTHER PUBLICATIONS

Apple—iLife—iMovie HD, 2005, 2 pages, Apple Computer Inc., downloaded from http://www.apple.com/ilife/movie on Jun. 22, 2005.

Apple—iLife—iMovie HD—Share, 2005, 2 pages, Apple Computer, Inc., downloaded from http://www.apple.com/ilife/imovie/share.html on Jun. 22, 2005.

Budde, P., Internet Technology—Streaming Media, 2002, 8 pages, downloaded from http://www22.verizon.com/about/community/learningcenter/articles on Jun. 8, 2005.

* cited by examiner

PERSONAL CHANNEL CATALOG 600

| VIEW CHANNEL | SEARCH | RATE | ADD TO FAVORITES | CREATE FOLDER |

| USER NAME | CHANNEL NO. | CHANNEL NAME | DESCRIPTION | AGE RATING | PRIVACY | LENGTH | AVG. RATING | NUMBER OF REVIEWS |
|---|---|---|---|---|---|---|---|---|
| JANE DOE | 001 | JOHN'S GRAD | NORTHERN H.S. GRAD '05 | G | FAMILY | 6 HR | 1/5 | 26 |

- FAVORITES
- RECENTLY VIEWED
- BIRTHDAYS
- HOLIDAYS

FIG. 6A

INTERACTIVE PROGRAMMING GUIDE
650

| FRIDAY | 7:00 PM | 7:30 PM | 8:00 PM |
|---|---|---|---|
| NBC | BROADCAST PROGRAM | | BROADCAST PROGRAM |
| ABC | BROADCAST PROGRAM | | BROADCAST PROGRAM |
| CBS | BROADCAST PROGRAM | | BROADCAST PROGRAM |
| PERSONAL CHANNEL 001 | | NORTHERN H.S. GRAD '05 | |
| FOX | BROADCAST PROGRAM | | BROADCAST PROGRAM |
| PERSONAL CHANNEL 002 | HOME STUDY: CHEMISTRY | | HOME STUDY: MATH |
| TNT | | COMMERCIAL MOVIE | |

[VIEW CHANNEL] [DETAILS] [RECORD] [ADD TO FAVORITES] [SEARCH] [SUBSCRIBE]

FIG. 6B

PERSONAL VIDEO CHANNELS

BACKGROUND INFORMATION

Consumers and businesses receive media content from a variety of sources. Using a basic television, viewers can watch traditional broadcast media received via an antenna. Amongst many limitations, there are very few ways for viewers to personalize the content using these traditional broadcasts and television sets.

Cable and satellite television services solve some of the problems associated with broadcast television. Cable television providers receive a wide selection of content from a variety of programming sources and transmit the content directly to subscribers'homes. In the home, a "set-top box" may receive a video signal and display the associated content on a television. In some cases, the set-top box permits the selective reception of "pay-per-view" content. The typical cable set-top box, however, also offers subscribers limited personalization of content because it relies on one-way broadcast transmissions over coaxial (including possibly optical fiber) cables to transport content.

Digital video recorders enable greater personalization of television content. Using a menu or program guide displayed on a television by the digital video recorder, viewers may select broadcast programs to be recorded, input and store viewing preferences and/or define parental controls. However, digital video recorders rely on existing broadcast video signals for delivery of content, and usually use low bandwidth phone lines to communicate with program guide providers, which are used simply to select particular broadcast "channels" from which the digital video recorder will record. Thus digital video recorders still allow only limited personalization.

The growth of the Internet offers individuals access to a wide variety of media content. For instance, Internet music services allow users to create personal music libraries. In particular, users may locate music content stored on the computing facilities of the service and, on-demand, download the content to their local computing device. Other facilities, such as "peer-to-peer" file sharing services, allow users to locate music content stored at remote "peer" computing systems over the network and download such music content to their local computing devices. This can be accomplished using a peer-to-peer sharing application executing on a user's computing terminal, which transmits a list of available files to a central server that maintains a central library of music files available in the network of terminals. By accessing the central server, a second user may search the central library and select a music file to download. In response, the central server provides the second user with information required to establish a connection with the first network terminal. Based on this information, the second terminal establishes a peer-to-peer connection with the first terminal which, in turn, transmits the music file to the second terminal. By this method, a user's ability to personalize media content is enhanced.

With regard to visual media content, interactive video communication services are known to allow users to communicate using real-time video and audio. However, these services are limited because they typically require that each user accept an invitation to establish contact and participate in the communication. Furthermore, the quality of such communications have heretofore been restricted due to the bandwidth and transport constraints of communications networks.

BRIEF DESCRIPTION OF THE DRAWINGS

FIG. 6A illustrates an exemplary catalog provided by a data center consistent with certain aspects of data related to the present invention;

FIG. 6B illustrates an exemplary interactive programming guide consistent with certain aspects of data related to the present invention;

DETAILED DESCRIPTION OF PREFERRED EMBODIMENTS

The following description refers to the accompanying drawings in which the same numbers in different drawings represent similar elements unless otherwise represented. The implementations set forth in the following description do not represent all implementations consistent with the claimed invention. Instead, they are merely examples of preferred systems and methods consistent with certain aspects related to the invention.

The preferred methods and systems consistent with certain aspects of the present invention provide a "personal channel" service allowing network-enabled user terminals (e.g., television set-top boxes or computing devices) to share media content over a network. In the preferred embodiments, a first user at a first user terminal creates a "personal channel" associated with one or more media content items. In conjunction with the creation of the personal channel, the user inputs metadata describing the media content of the personal channel. This metadata is transmitted to a network data center where it is stored in association with a first user terminal identifier. Based on the metadata, the data center may generate a listing of personal channels (e.g., an online catalog or interactive program guide) available over the network. A second user at a second user terminal may access the catalog, search the catalog, and select the first user's personal channel. In response to the selection, the network data center transmits the first user terminal identifier associated with the selected personal channel to the second user terminal. Based on the terminal identifier, the second user terminal requests access to the selected personal channel from the first user terminal. In response to the request, the first user terminal provides the media content associated with the personal channel to the second user terminal over the network.

Figure 1:
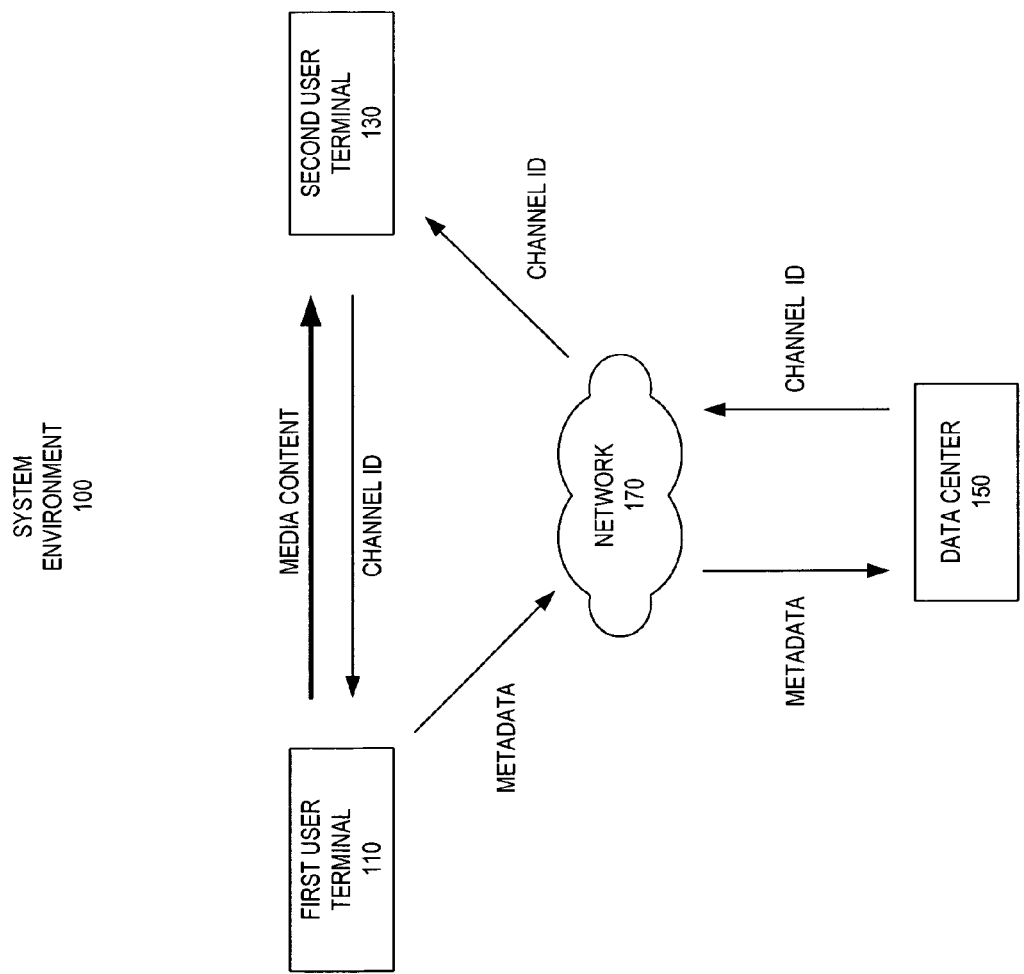
FIG. 1 illustrates a block diagram of an exemplary system environment consistent with certain aspects related to the present invention.

FIG. 1 provides a block diagram exemplifying system environment 100 consistent with a preferred embodiment of the present invention. System environment 100 may include first user terminal 110, second user terminal 130, data center 150 and network 170.

User terminals 110 and 130 may include components consistent with computing or display systems such as processors, memory and input/output devices that enable a user to create, store, and present personal channels, as well as other aspects consistent with the present invention. User terminals 110 and 130 may be implemented using one or more generic computer systems including, for example, personal computer, minicomputer, microprocessor, workstation or similar computer platforms typically employed in the art. Alternatively, user terminals 110 and 130 may encompass or be embedded within a specialized computing system including, for example, a set-top box, video telephone, video game console, portable telephone, personal digital assistant, or portable game device. User terminals 110 and 130 may be located in a user's home, at a business, in a public kiosk or in a portable device. Furthermore, user terminals 110 and 130 may be a owned by a user or may be provided to the user by a communications service provider, for example, in conjunction with television broadcast service, telephone service, broadband data service (e.g., Internet), or other communications services.

Consistent with aspects of this invention, data center 150 executes computer instructions for brokering the exchange of media content between user terminals 110 and 130 over network 170. Further, data center 150 may store personal channel metadata and, in some embodiments, personal channel media content. Data center 150 may be one or more computer systems including, for example, personal computer, minicomputer, microprocessor, workstation or similar computer platforms typically employed in the art. Data center 150 may include, among other components, processors, memory, and input/output devices that enable data center 150 to facilitate the preferred methods described herein.

Network 170 may be one or more communication networks that communicate information between user terminals 110 and 130, and data center 150. Network 170 may be any type of network for communicating information, including data, text, pictures, voice and video. In some instances, communications network 170 may possess sufficient bandwidth to transmit real-time video between user terminals 110 and 130 and/or data center 150. Network 170 may be a shared, public, private, or peer-to-peer network encompassing a wide or local area including an extranet, an Intranet, the Internet, a Local Area Network (LAN), Wide Area Network (WAN), public switched telephone network (PSTN), Integrated Services Digital Network (ISDN), radio links, cable television network, satellite television network, terrestrial wireless network, and any other form of wired or wireless communication networks.

Network 170 may be compatible with any type of communication protocol used by the components of system environment 100 to exchange information, such as Ethernet, ATM, Transmission Control/Internet Protocol (TCP/IP), Hypertext Transfer Protocol (HTTP), Hypertext Transfer Protocol Secure (HTTPS), Real-time Transport Protocol (RTP), Real Time Streaming Protocol (RTSP), Global System for Mobile Communication (GSM) and Code Division Multiple Access (CDMA) wireless formats, Wireless Application Protocol (WAP), high bandwidth wireless protocols (e.g., EV-DO, WCDMA) or peer-to-peer protocols. The provider(s) of network 170 may be, for instance, an Internet Service Provider (ISP), a landline telephone carrier, a cell phone system provider, a cable television provider, a satellite television provider, an operator of a WAN, an operator of LAN, or an operator of point-to-point network.

The preferred embodiments described herein may be implemented in various environments. Such environments and related applications may be specifically constructed for performing the various processes and operations described herein, or they may include a general purpose computer or computing platform selectively activated or configured by program instructions to provide the described functionality. The processes disclosed herein are not inherently related to any particular computer or other apparatus, and may be implemented by a suitable combination of hardware, software, and/or firmware. For example, various general purpose data processing machines may be used with programs written to implement portions of the preferred embodiments described herein; or it may be more effective, convenient and/or cost-effective to construct a specialized apparatus or system to perform the described methods or techniques.

The preferred embodiments described herein may be further implemented in processor-readable media that include program instructions and/or data configured to perform the various methods described herein. The program instructions may be those specially designed and constructed, or they may be of the kind well-known and available to artisans in the field of computer software. Examples of program instructions include, for example, machine code such as produced by a compiler, files containing high-level code executable by a computer via an interpreter, or levels of abstraction therebetween.

FIG. 1 further illustrates the flow of information between user terminals 110 and 130, and data center 150 over network 170. After creating a personal channel, first user terminal 110 transmits information associated with the personal channel (e.g., metadata) over network 170 to data center 150. Subsequently, when second user terminal 130 selects the first user's personal channel from data center's 150 catalog of personal channels, data center 150 transmits a first user network terminal identifier to the second user terminal 130. Based on the identifier, second user terminal 130 contacts first user terminal over network 170 and requests transmission of the personal channel. In response, first user terminal 110 establishes a communication link to second user terminal 130 and proceeds to transmit the media content associated with the selected personal channel directly to second user terminal 130. Alternatively, second user terminal 130 may accesses personal channels at first user terminal 110 directly based on the identifier of first user terminal 110. In other alternatives, second user terminal 130 may access personal channels stored at data center 150.

As illustrated in FIG. 1, system environment 100 includes two user terminals 110 and 130, a single data center 150, and network 170. However, as is readily apparent to an artisan, practical embodiments may include a plurality of user terminals and/or data centers linked over multiple networks by a plurality of network exchange points sharing data between the networks.

Figure 2:
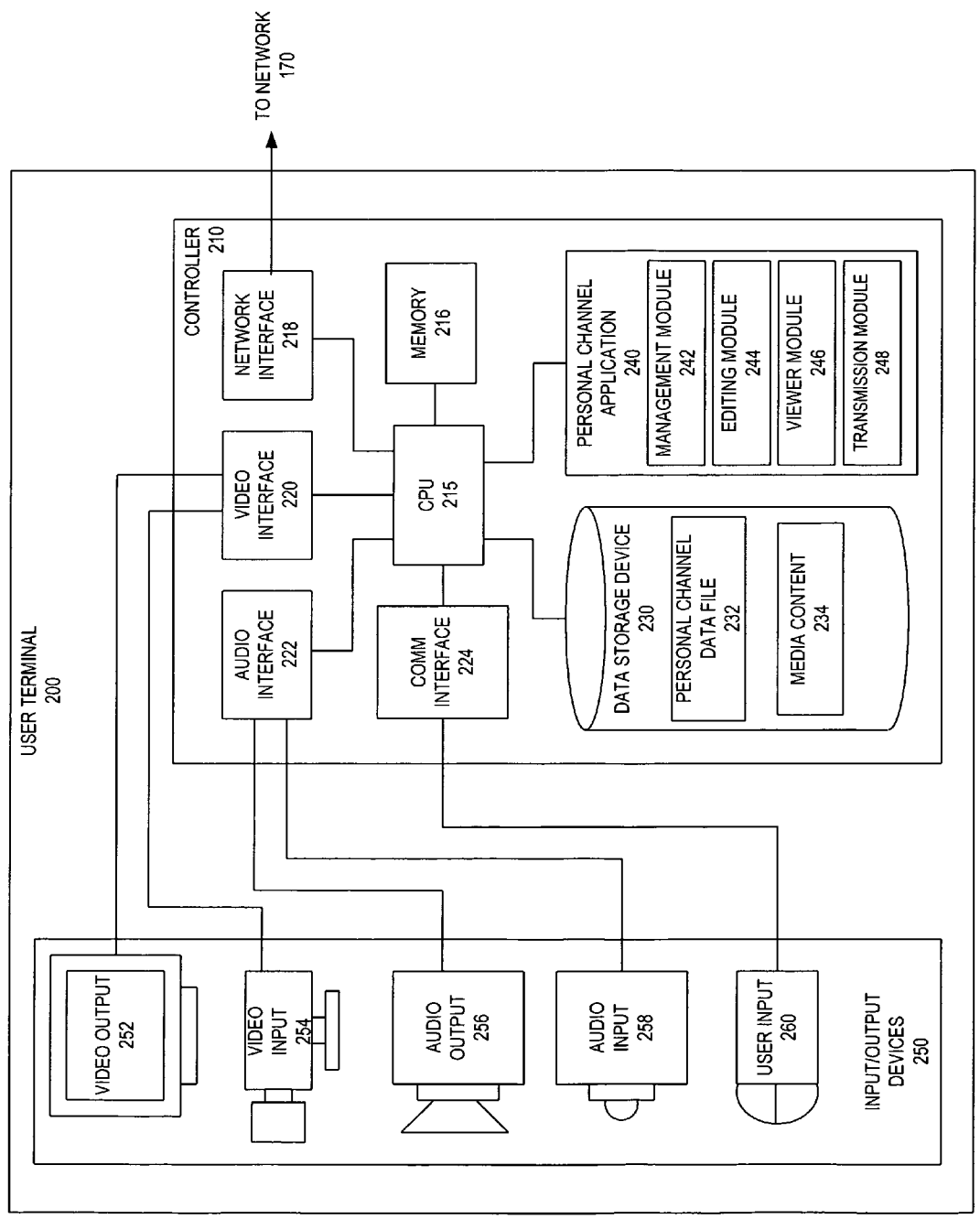
FIG. 2 illustrates a block diagram of an exemplary user terminal consistent with certain aspects of the present invention.

FIG. 2 provides a block diagram showing aspects of an exemplary user terminal 200 including components for creating a personal channel, providing the personal channel to other user terminals, and certain other components. User terminal 200 may include controller 210 and input/output devices 250. Controller 210 may be one or more processing devices that execute computer instructions stored in one or more memory devices to provide functions consistent with certain aspects of the preferred embodiments described herein. Controller 210 may include, for example, central processing unit (CPU) 215, memory 216, network interface 218, video interface 220, audio interface 222, communications interface 224 and data storage device 230.

CPU 215 provides control and processing functions for user terminal 200 by processing instructions and data stored in memory 216. CPU 215 may be any conventional controller such as off-the-shelf microprocessor (e.g., INTEL PEN- TIUM), or an application-specific integrated circuit specifically adapted for network terminal 200. CPU 215 may also include, for example, coprocessors, memory, registers and/or other processing devices as appropriate.

Memory 216 may be one or more memory devices that store data, operating system and application instructions that, when executed by CPU 215, perform the processes described herein. Memory 216 may include semiconductor and magnetic memories such as random access memory (RAM), read-only memory (ROM), electronically erasable programmable ROM (EEPROM), flash memory, optical disks, magnetic disks, etc. When user terminal 110 executes an application installed in data storage device 230, CPU 215 may download at least a portion of instructions from data storage device 230 into memory 216.

Network interface 218 may be one or more hardware and/or software components configured to send and receive information between CPU 215 and network 170. Network interface 218 may receive and transmit communications for user terminal 200. For example, network interface 218 may be a modem, or a local area network ("LAN") port. Network interface 218 may support any telecommunications or data network including; for example, Ethernet, WiFi, token ring, ATM, ISDN. Alternatively, network interface 218 may be an external network interface connected to CPU 215 though communications interface 224.

Video interface 220 may be any device for enabling information exchange between CPU 215 and video devices 252 and/or 254. For instance, video interface 220 may include an analog-to-digital converter for converting analog video signals produced by video device 254 into digital data. Similarly, video interface 220 may include a digital-to-analog converter for converting digital video data from CPU 215 into analog video signals for video output device 252. Furthermore, video interface 220 may include a CODEC for compressing and/or decompressing the video data. Although the video interface is described as a hardware device, it may also be implemented completely in software, or in a combination of hardware and software.

Audio interface 222 may be any device for enabling information exchange between CPU 215 and audio devices 256 and/or 258. For instance, audio interface 222 may include an analog-to-digital converter for converting analog audio signals produced by audio input device 258 into digital data. Similarly, audio interface 222 may include a digital-to-analog converter for converting digital audio data into analog audio signals for audio output device 256. Furthermore, audio interface 222 may include an audio CODEC for compressing and/or decompressing the audio data. Although audio interface 222 is described as a hardware device, it may also be implemented completely in software, or a combination of hardware and software.

Communications interface 224 provides one or more interfaces for transmitting and/or receiving data into CPU 215 from external devices, including any of input/output devices 250. Communications interface 224 may be, for example, a serial port (e.g., RS-232, RS-422, universal serial bus (USB), IEEE-1394), parallel port (e.g., IEEE 1284), or wireless port (e.g., infrared, ultraviolet, or radio-frequency transceiver). In some embodiments, audio, video and/or network data may be exchanged with CPU 215 through communications interface 224.

Input/output devices 250 include video output 252, video input 254, audio output 256, audio input 258 and user input 260. Video output 252 may be any device for displaying visual information such as a cathode ray tube (CRT), liquid crystal display (LCD), light emitting diode display (LED), plasma display, or electroluminescent display. Video input device 254 may be an analog or digital camera, camcorder, or other image-capture device. Audio output device 256 may be a speaker, headphone, earpiece, or other audio transducer that converts electrical signals into audible tones. Audio input 258 device may be a microphone or other audio transducer that converts audible sounds into electrical signals and may be a stand-alone device or incorporated in other devices such as a telephone handset. Signals from input/output devices may also be exchanged with CPU 215 through communications interface 224. User input device 260 may be any conventional device for communicating user's commands to network terminal 200 including, for example, keyboard, keypad, computer mouse, touch screen, trackball, scroll wheel, joystick, television remote controller, or voice recognition controller.

Data storage device 230 includes computer-readable instructions and data for user terminal 200 to provide and/or access personal channels over network 170. Data storage device 230 may include, for example, program code for a personal channel application 240, a personal channel data file 232 and media content 234. In addition, data storage device 230 may include other computer instructions, such as program code for Internet communications, operating system, kernel, device drivers, configuration information, such as a Dynamic Host Configuration Protocol configuration, a web browser, and any other software that may be installed on user terminal 200. For example, data storage device 230 may store a user interface that may be accessible using input/output devices 250 and allow users of the user terminal 200 to access the functionality provided therein. Where the user terminal 200 is implemented as a set-top box, the user interface may include such features as a program guide, channel selector, pay-per-view or video-on-demand selector, and an interface to control the various video recording and playback control options. In the preferred embodiments, such a user interface includes an access to the personal channels facilities described herein, thus allowing a user of user terminal 200 to select the personal channel facility using, for example, the user input devices 260 available to user terminal 200.

The configuration or relationship of components 210-260 illustrated in FIG. 2 is exemplary. The components of user terminal 200 may be independent components operatively connected, or they may be integrated into one or more components including the functions of some or all of components 210-260. For example, input/output devices 250 may be a plurality of independent devices within separate housings detachably connected to a generic controller, such as a personal computer or home entertainment system. In other implementations, controller 210 and input/output devices 250 may be integrated within a single housing such as a set-top box or portable telephone. One of ordinary skill in the art may select different configurations of components based on the requirements of a particular implementation of a network terminal giving consideration to factors including, but not limited to, cost, size, speed, form factor, capacity, portability, power consumption and reliability.

User terminal may include functionality directed towards other capabilities. For example, user terminal 200 may be a set-top box providing broadcast video. In such a case, the user terminal may include components such as a radio-frequency (RF) interface to receive and transmit broadcast signals. The RF interface may be further connected to other known components for tuning and processing RF modulated audio/video signals, which may also be connected to the video interface 220 and/or audio interface 222. Likewise, if the user terminal 200 is a mobile telephone, the user terminal may include other components such as an RF interface to receive and transmit wireless communications signals, which may be further connected to other known components to process such wireless communications signals, and which may be further connected to network interface 218 to provide connectivity to network 170.

As further illustrated in FIG. 2, preferred user terminal 200 may execute software processes associated with providing personal channels, as further described below. CPU 215 may execute personal channel application 240 including management module 242, editing module 244, viewer module 246 and transmission module 248.

Management module 242 includes computer instructions executed by CPU 215 for providing an interactive user interface for managing personal channels (which may be accessible via the general user interface provided by user terminal 200). Management module 242 may enable a user to create, view, store, edit and delete personal channels stored on user terminal 200. Further, management module 242 may enable the user to manage a library of personal channels. Through the library, a user may selectively view and/or edit personal channel metadata including, for instance, name, subject, description, privacy setting, approved viewers, viewer age, creation time/date, media content, media content size, last viewed time/date, number of viewings, average viewer rating. Further, the library may enable a user to organize channels into categories. For instance, the management module may allow the user to organize personal channels into related categories according to any of the aforementioned metadata.

Editing module 244 may include computer instructions executed by CPU 215 for providing an interactive user interface for modifying media content. Editing module 244 may, for example, allow a user to cut, trim, paste, merge, add special effects, add text, sound and/or themes. In some implementations, editing module 244 may be a third-party media-editing software application such as, for example, IMOVIE by Apple Computer, Inc.

Viewer module 246 may include computer instructions executed by CPU 215 for providing an interactive user interface for viewing media content. Viewer module 246 may provide controls for playing, recording, rewinding, reviewing, cueing, fast-forwarding, and/or pausing media content. In some implementations, viewer module 246 may be a third-party media viewer application such as QUICKTIME by Apple Computer, Inc., or WINDOWS MEDIA PLAYER by Microsoft Corp.

Transmission module 248 may include computer instructions executed by CPU 215 for transmitting media content between user terminals 110 and 130. In some implementations, transmission module 248 may transmit content in "real-time" such that the content is displayed at a receiving user terminal at, or nearly at the same rate the content is are transmitted with little or no perceptible delay by the receiving user (e.g., 30 frames per second or faster). For example, in response to a request to view a personal channel from a second user terminal 130 over network 170, personal channel application 240 executing in first user terminal 110 may cause transmission module 248 to initiate a video transmission of media content in RTP protocol. In other implementations, the content may be "streamed" to second user terminal 130 in discrete, viewable portions and displayed by second user terminal 130 as it is received (with some local buffering to avoid network transmission problems). In still other implementations, the media content may be downloaded as a single file that is received by second user terminal 130 as a whole before being displayed. Moreover, transmission module 248, may adjust the format and/or quality of the requested content to suit the capabilities or preferences of the second user terminal 130 (e.g., mobile telephone, personal computer or television.)

The configuration or relationship of software modules 240-248 illustrated in FIG. 2 is exemplary. Software modules 240-248 may be independent modules operatively connected, or they may be combined within a single module including the functions of some or all of the modules.

Figure 3:
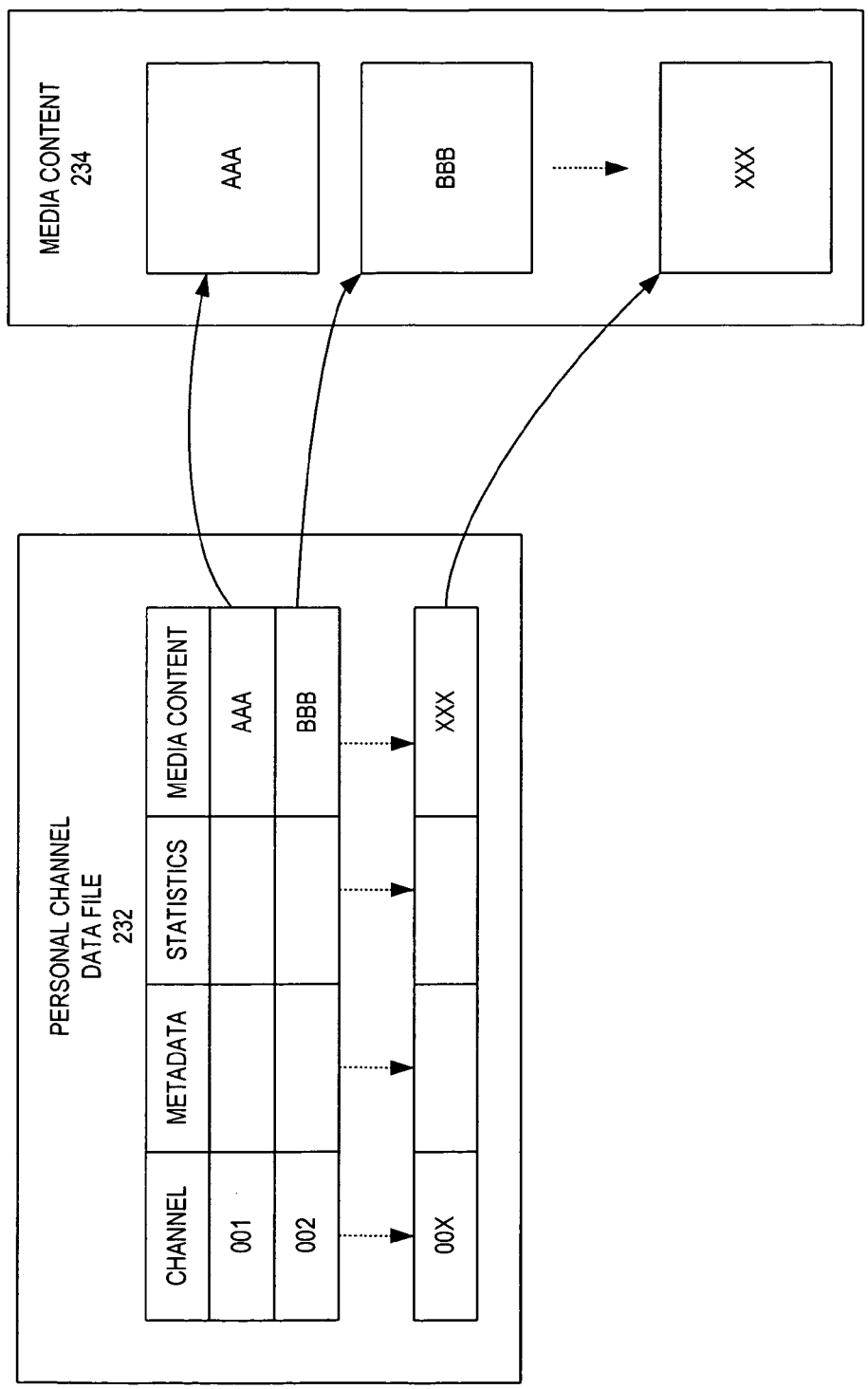
FIG. 3 illustrates a block diagram of exemplary personal channel data stored at a network terminal consistent with certain aspects of the present invention.

FIG. 3 provides a block diagram illustrating an exemplary personal channel data file 232 and media content 234 stored on user terminal 200 in storage device 230. As illustrated, personal channels data file 232 may associate records (e.g., 001 and 002) with media content 234. A record may be associated with any type of media content 234 including audiovisual works, motion pictures, pictorial works, graphic works, or sound recordings. Media content 234 may be user-generated content captured on a user input/output devices 250 and uploaded to a user terminal 200. For example, the content may be a home video captured by a user with a camcorder.

Personal channel data file 232 may include a plurality of personal channel records associating a specified personal channel with a specified content item. In the example of FIG. 3, channel record with the identifier "001" has been specified as including the media item "AAA." Although illustrated in FIG. 3 as a one-to-one mapping, a personal channel may be associated with more than one piece of content, for example, by inclusion of multiple records identifying a matching channel identifier with different content items. Likewise, individual content items may be associated with more than one personal channel record by including a reference to the content item in multiple records. Although FIG. 3 shows the record for personal channel "001" referencing media content item "AAA" by name (e.g., a file/directory name), the media content may be referenced by, for example, a memory address to the location of the of the audiovisual file in the storage device, a video resource locator (VRL), a uniform resource locator (URL) or network address identifying a location on network 170.

Personal channel data file 232 may include additional information associated with a personal channel including personal channel metadata and statistics. Metadata may include information such as the personal channel name, description, subject, privacy category and viewer age rating. Statistics may include information such as creation time/date, content size, running time, last viewed time/date, number of viewings and average viewer rating. Alternatively or concurrently, such additional information about personal channels created by the user may be stored at data center 150, as further described below.

Figure 4:
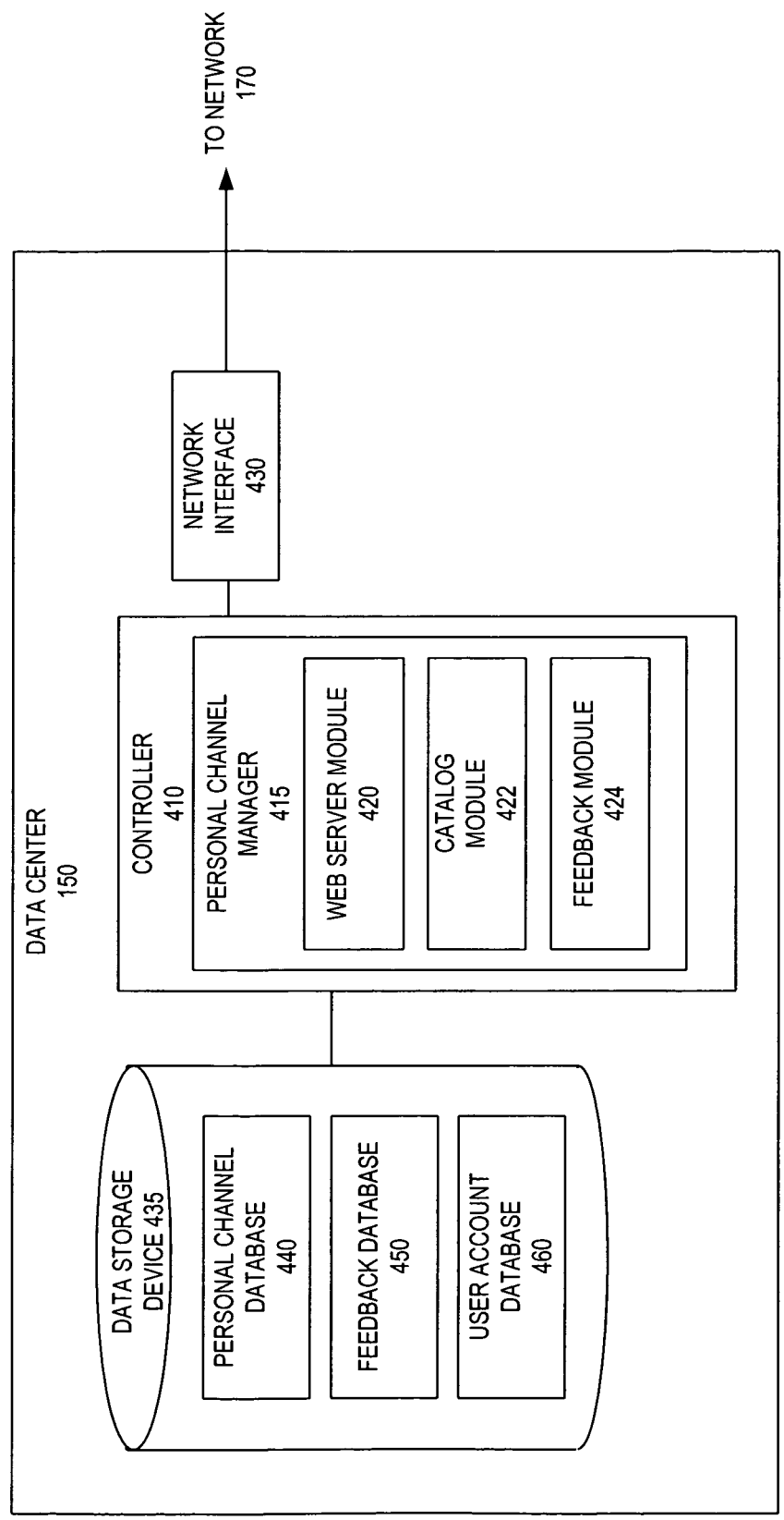
FIG. 4 illustrates a block diagram of an exemplary data center consistent with certain aspects of the present invention.

FIG. 4 provides a block diagram of an exemplary data center 150, which may be one or more processing devices that execute software modules stored in one or more memory devices to broker the exchange of personal channels between user terminals 110 and 130, and provide other functions as described herein. Data center 150 may include controller 410, network interface 430, and data storage system 435.

Controller 410 may be one or more generic computer systems including, for example, a personal computer, minicomputer, microprocessor, workstation or similar computer platforms typically employed in the art. Controller 410 may be comprised of a CPU and memory for executing and storing data and instructions as is well known. CPU may be any conventional controller such as an off-the-shelf microprocessor (e.g., INTEL PENTIUM), or an application-specific integrated circuit specifically to adapted for data center 150. Memory may be one or more memory devices that store computer instructions and data that, when executed by the CPU, perform the methods described herein. These memory devices may include semiconductor and magnetic memories such as RAM, ROM, EEPROM, flash memory, optical disks, magnetic disks, etc. Network interface 430 may support any telecommunications or data network including, for example, Ethernet, ATM, IP, WiFi, token ring, Fiber Distributed Data Interface.

Data storage system 435 may be one or more memory devices to store computer instructions and data used by controller 410. Data storage system 435 may include: personal channel database 440, feedback database 450 and user account database 460. Personal channel database 440 includes records associating personal channel identifiers and metadata with a channel identifier, allowing other users to access personal channels over network 170. Additionally or alternatively, personal channel database 440 may store media content for access over network 170. For example, a user may lease data storage space at data center 150 from the user's communications service provider in lieu of, or in addition to storing media content at user terminal 110.

Feedback database 450 includes records associating a personal channel with ratings submitted by users. For instance, as illustrated in FIG. 5B, feedback database 450 may associate each personal channel with one or more of a terminal identifier, a plurality of viewer ratings, a count of viewer ratings submitted and an average viewer rating. User account database 460 may contain a plurality of data records associating a user with a terminal identifier, login name, password, personal information (e.g., address, phone number) and/or demographic information (e.g., gender and age). Although FIG. 4 illustrates databases 440-460 as being stored locally in data storage device 435, any of databases 440-460 may instead be located external to data center 150 and accessible through network 170.

As further illustrated in FIG. 4, controller 410 may execute software processes that support the implementation of the exemplary personal channel systems and methods. In addition to operating systems and other software applications typically employed in a network server, controller 410 may execute a personal channel manager 415 including web server module 420, catalog module 422 and feedback module 424. Web server module 420 provides functionality for receiving traffic over network 170 from user terminals 110 and 130. For example, web server module 420 may be a standard Hypertext Transfer Protocol (HTTP) server that a user may access using a web browser program, such as Microsoft's Internet Explorer. Catalog module 422 may include computer-executable instructions for generating an interactive catalog of personal channels available on network 170 based on personal channel metadata submitted by users at user terminals 110 and/or 130 (and stored, for example, in personal channel database 440). Feedback module 424 may include computer-executable instructions for calculating personal channel ratings submitted by user terminals 110 and/or 130 (and stored, for example, in feedback database 450).

Figure 5A:
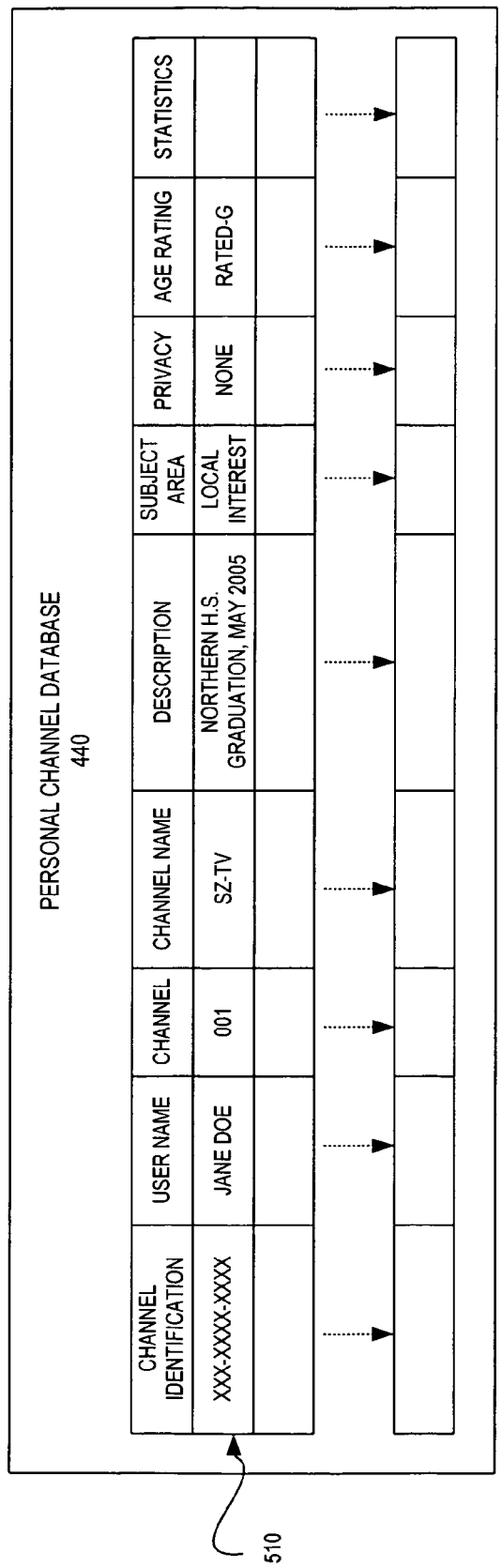
FIG. 5A illustrates a block diagram of an exemplary personal channel database consistent with certain aspects of the present invention.
Figure 5B:
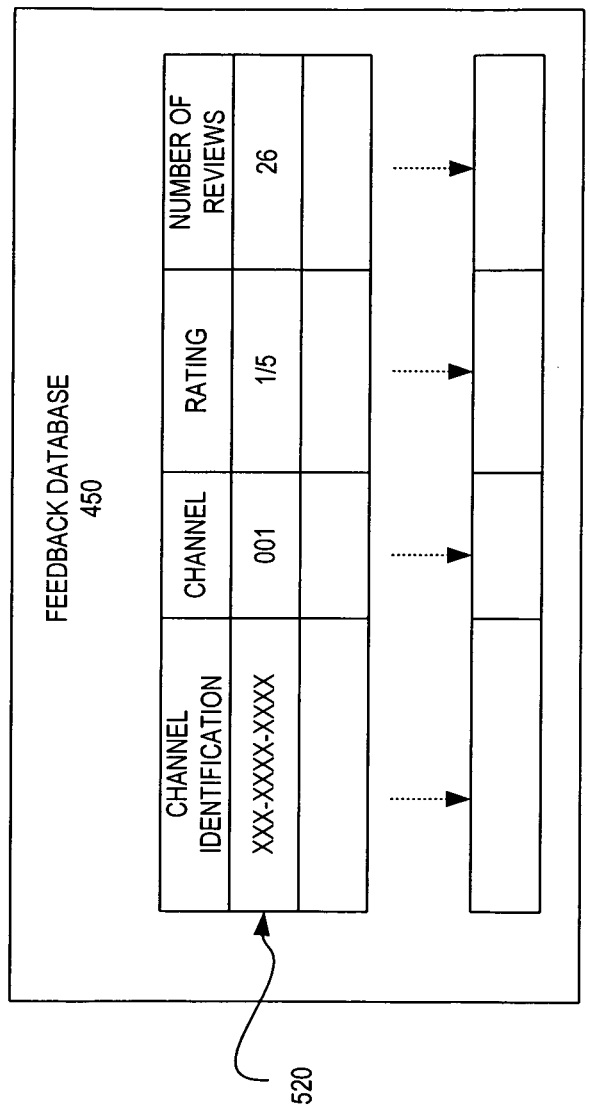
FIG. 5B illustrates a block diagram of an exemplary feedback database consistent with certain aspects of the present invention.

FIG. 5A provides a block diagram illustrating an exemplary personal channel database 440 stored at data center 150 in data storage device 435. Personal channel database 440 may include a plurality of records for a plurality of personal channels stored at user terminals 110 and/or 130. For instance, personal channel record 510 may associate a personal channel with a channel identifier and personal channel metadata. A channel identifier may be any means of identifying user terminal 110 and 130 on network 170 including, for example, a network address, video resource locator (VRL), a telephone number, a MAC or IP address, or a URL. Metadata may include a user name, personal channel name and identifier, personal channel description, subject area, privacy category and viewer age rating. The user name may be, for instance, the author of the media content or the creator of the personal channel. The channel name may be the short title given to the personal channel by the user who created the channel, and the channel identifier may be the identifier assigned to the channel by the creating user's terminal. The personal channel description may be the detailed description of the subject matter of the personal channel. The personal channel subject may be a general subject area (e.g., genre) associated with the content in the personal channel, which may be useful in identifying/grouping personal channels of interest to other users, such as, movies, sports, comedy, drama, action, education, history, local interest, and the like. The privacy category may be level of public access given to the personal channel. For instance, a channel may be available to the general public or, alternatively, the access to the personal channel may be limited to a predetermined set of users or network terminals. Age rating is an age category of the viewer for which the personal channel may be appropriate. For example, similar to Motion Picture Association of America's movie ratings, the user who creates a personal channel may designate the subject matter as appropriate for children, teenagers, or adults. Privacy and age rating data may be used by data center 150 in conjunction with user data stored in user account database 460 to deny access to personal channels by users not meeting the parameters specified in the privacy and/or age rating data. In addition, personal channel record 510 may contain additional data including personal channel statistics such as creation time/date, media content size, running time and last viewed time/date.

FIG. 5B provides a block diagram illustrating an exemplary feedback database 450. Feedback database 450 may include a plurality of records associated with personal channels included in personal channel database 440. Feedback record 520, for example, may include an association between a personal channel and a rating submitted by users who have viewed the personal channel. Records data 520 may include a channel identifier, channel name, rating and number of reviews. The rating may be, for example, an average rating calculated by controller 410 based on a plurality of ratings submitted by users who have viewed the associated personal channel, or may be a rating by a single user who has viewed the associated personal channel (in which case there may be multiple records 520 associated with each personal channel, corresponding to ratings by individual viewing users).

FIGS. 6A and 6B provide diagrams illustrating an exemplary personal channel catalog 600 and an interactive programming guide 650. Based on data from personal channel database 440 and feedback database 450, data center controller 410 (using the facilities of catalog module 422) generates personal channel catalog 600. Catalog 600 may be implemented using, for example, hypertext markup language (HTML) or extensible markup language (XML), and may be presented to user terminals 110 and 130 over network 170 in an Internet browser or other user interface available at the user terminal.

As shown in FIG. 6A, personal channel catalog 600 may list personal channels available at user terminals 110 and/or 130, based on a plurality of categories generated from personal channel database 440 and feedback database 450, including subject, channel name, creating user's name, channel description, viewer age rating, privacy level, length, viewer rating and number of viewer reviews. As typical, a user may selectively sort personal channels listed in the catalog 600 based on any one of the displayed categories.

Catalog module 422 may allow users to perform additional operations which may be accessible via catalog 600. In the preferred catalog 600 of FIG. 6A, display elements are provided that enable a user to select from a plurality of operations including, "search", "rate", "add-to-favorites," "create folder" and "view channel". If a user selects the "search" operation, the user may perform a keyword search of the personal channel database 440. This may be accomplished by submitting a search query to data center 150, which may generate a catalog 600 containing search results corresponding to the search query, or through a local filtering of the catalog 600 and redisplay of search results corresponding to the search query which are a subset of the catalog 600. If a user selects the "rate" operation, a user may be prompted to submit a rating of a personal channel to data center 150 which stores the feedback in database 450 in association with the selected personal channel. If a user selects "add to favorites", the user may add a selected personal channel to a "favorites" data record associated with the user in, for example, user account database 460. If a user selects the "view" operation, then personal channel module 420 executes a process allowing the user to view the selected video stored on a user terminal 110 and/or 130, as further described below. In addition to the "favorites" folder, the recently viewed personal channels of the user may automatically be stored in a "recently viewed" data record associated with the user in, for example, user account database 460, and may be accessible to the user via a "recently viewed" folder accessible via catalog 600. The user may also create folders having personalized themes such as, for instance, "family", "birthdays" and "holidays" which may be accessible via catalog 600.

Additionally or concurrently, personal channels 232 may be displayed as a channel listing within an interactive programming guide 650 supplied by a provider of broadcast or subscription television programming. Using the interactive programming guide 650, customers of the provider may browse and select personal channels alongside commercial and broadcast television channels offered by the provider. For instance, as shown in FIG. 6B, "personal channel 001" and "personal channel 002" are listed together with common commercial broadcast channels (e.g., NBC, ABC, CBS, FOX and TNT). A user may, for instance, acquire rights from the provider include the user's personal channel(s) in the provider's programming guide 650. In some cases, the rights may allow the user to control the content of an entire channel listed in the programming guide 650. In other cases, the rights may allow several users to share a single personal channel listing during different time periods. By offering personal channels in interactive programming guide 650 together with commercial programming, a user may expose the personal channel to a provider's broad audience that may be otherwise inaccessible to the user.

The interactive programming guide 650 may be a graphical user interface generated by the provider and presented to customers through a terminal 200 (e.g., a set-top box, remote control, and television). The provider may obtain the personal channel metadata 510 and/or 520 from the data center 150 for inclusion in the interactive programming guide 650. The data center 150 may, for example, simply send this metadata to the provider or the provider may retrieve the metadata using a request/response mechanism (free or fee-based) known to those skilled in the art. The television provider may then format the personal channel metadata 510 or 520 for presentation within the provider's interactive programming guide 650 in a combined listing including broadcast television program information. For example, as shown in FIG. 6B, programming guide 650 may present commercial/broadcast channels and personal channels in a table based on the time and date. Alternatively, the interactive program guide 650 may enable a customer to select from a listing of commercial/broadcast channels and personal channels available for transmission on-demand.

A customer of the provider may interact with the programming guide 650 in the typical manner. By way of example, using a television remote control to input selections to a set-top box, a customer may view a personal channel by selecting the channel's listing from the programming guide 650. The programming guide 650, may enable a customer to choose from other interactive functions, such as requesting channel details, recording channel content, and/or adding the a channel to a list of the customer's favorites. In addition, the interactive programming guide 650 may enable a user to search for channels and/or content available from the provider, and include personal channels in a search result together with commercial channels meeting the customer's search criteria.

Moreover, through the interactive programming guide 650, a customer may receive a notification that the customer has been invited to subscribe to another's personal channel. If the invitation is accepted, the personal channel may be included in the customer's interactive programming guide 650. For instance, a user may create a private personal channel accessible to a limited group of customers, such as the user's family members. A customer included in the group may receive an indication through the programming guide 650 that he/she is invited to subscribe to the personal channel and, by selecting "subscribe" through the interactive programming guide 650, that personal channel may be added to the customer's channel listing.

Figure 7:
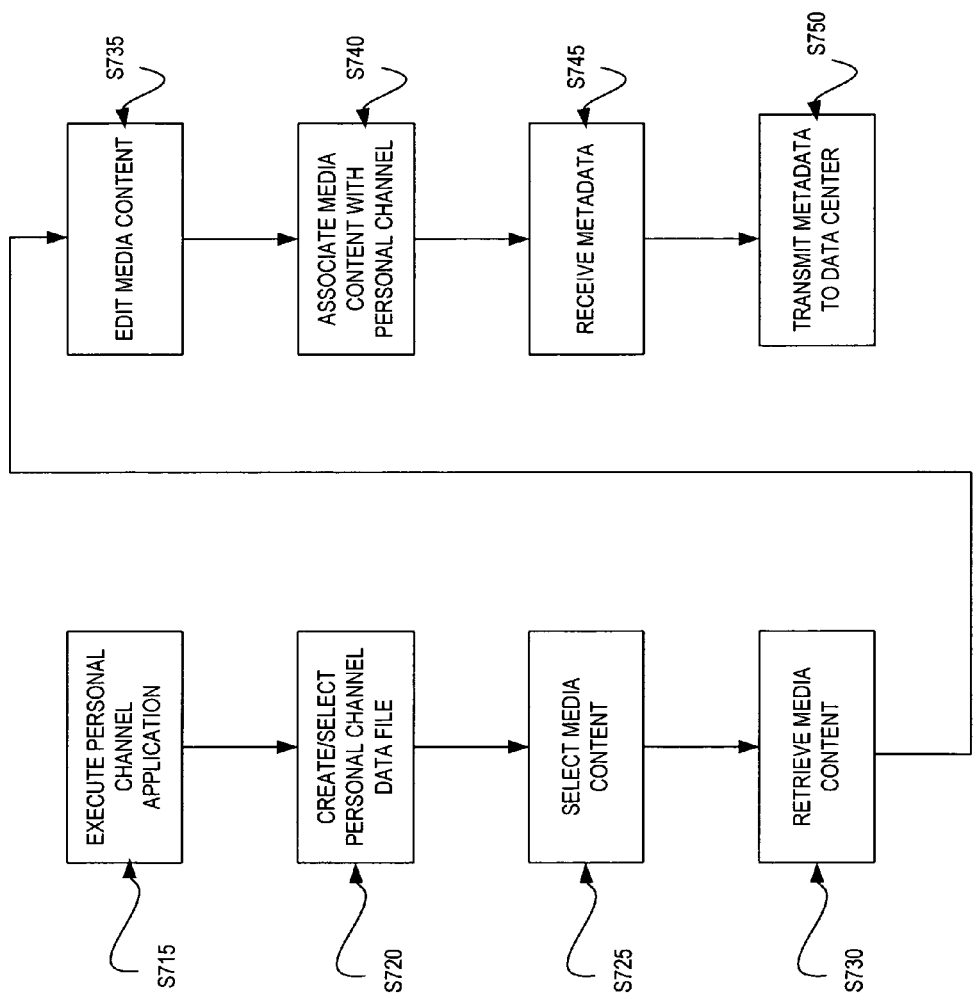
FIG. 7 illustrates a flowchart exemplifying a first aspect related to the present invention.

FIG. 7 is a flowchart illustrating an exemplary process for providing a personal channel. Initially, a user may navigate a user interface of the user's terminal to locate and execute personal channel application 240 (S715). For example, where user terminal 100 is a set-top box in combination with a television, the user may use a remote control to navigate an on-screen program guide to select the personal channel application 240. Where user terminal 100 or 130 is a mobile phone/device, the user may use a keypad to navigate a menu system to select the personal channel application 240. The application 240 displays an interactive user interface which prompts the user to either select an existing personal channel or to create a new personal channel (S720). If the user selects an existing personal channel, a new record is established in personal channel data file 232 using the existing identification information for the personal channel. If the user chooses to create a new personal channel, a new record is established using new identification information associated with this new personal channel.

Next, personal channel application 240 may prompt the user to select media content to associate with the personal channel (S725). The media content may be stored on a separate user device (e.g., a video camera, a personal computer), on user terminal 110, or even remotely stored on network 170. In the event the media content item is stored on a separate user device, the personal channel application 240 may prompt the user to connect the separate user device to the user terminal through, for example, communications interface 224 and, subsequently, transfers the media content item from the user device to media content database 234 in data storage device 230 (S730). In the event the media content is stored on user's terminal 110 or in another location accessible via network 170, the application 240 may prompt the user for the location of the media content item, which may be specified in many well known ways (e.g., file/directory name, URL), and use the location information to retrieve (if necessary) that media content item and store such content on user's terminal 110.

After media content is retrieved for the personal channel, personal channel application 240 may provide the user the option to edit the media content item through editing module 244 (S735). The user may, for example, merge the media content item into other media content, trim the media content item, remove artifacts or blemishes, add titles, music, voice-over special effects, transitions between different portions or other typical media content editing procedures.

Next, personal channel application 240 may prompt the user to enter personal channel metadata describing the personal channel (S745). For instance, where user's network terminal 110 is a set-top box, the user may use the remote control to input information describing the personal channel. Referring back to FIG. 5A, one example of such information for a personal channel related to graduation ceremony includes metadata information such as a channel name (e.g., "John's Graduation"), description ("Northern High School Graduation 2005"), privacy category (e.g., "none") and viewer age rating (e.g., "Rated-G"). In the case where the user is adding a content item to an existing personal channel, the user may be given the opportunity to edit the metadata already associated with the personal channel.

When the user completes the process of creating/updating a personal channel, the metadata is transmitted (S750) by the user's network terminal 110 to data center 150 over network 170 where it is stored in personal channel database 440 in association with a channel identifier associated with the user or the user's terminal (e.g., VRL, the user's telephone number, the MAC or IP address of the user terminal). Alternatively, a user may also store personal channel media content at data center 150 rather than storing the media content at user's terminal 110.

Figure 8:
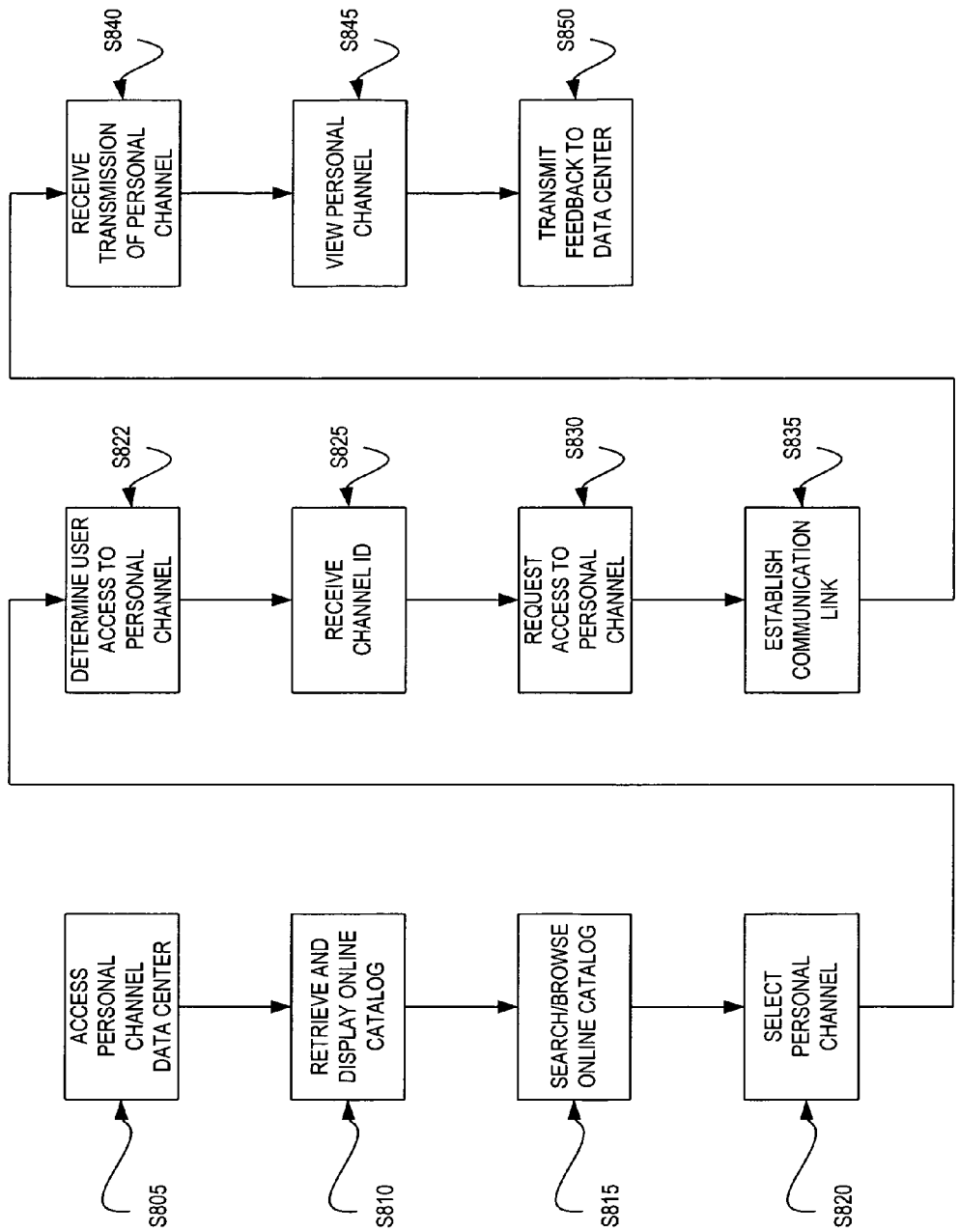
FIG. 8 illustrates a flowchart exemplifying a second aspect related to the present invention.

FIG. 8 is a flowchart illustrating an exemplary process for viewing personal channels. In order to view a personal channel, a second user at a second user terminal 130 may use the user interface provided by second user terminal 130 to access the personal channels application provided therein (S805). In the case of a set-top box, this may be accomplished by navigating to a portion of an interactive program guide which allows the second user to invoke the personal channels application 240. In some embodiments, the program guide may provide a combined list of channels including personal, commercial and broadcast channels. The second user terminal 130 may then access the data center 150 over network 170 to retrieve personal channel catalog 600 and display this to the user (S810). This may be accomplished, for example, by making an appropriate request to the HTTP server capabilities of data center 150 to provide the catalog 600 to the second user terminal 130, and by data center 150 providing the catalog 600 to the second user terminal 130. The second user terminal may display the catalog 600 using its user interface functionality. Optionally, depending on the identity of the second user (which may be determined based on the terminal identifier of the second user terminal 130 or through a commonly known log-in process), the data center 150 may limit the contents of the catalog to those personal channels which the second user has sufficient rights to access, based on the privacy category set for the personal channel in the associated record in the personal channel database 440.

Through personal channel catalog 600, the second user may browse or search available personal channels (S815). For instance, where second user terminal 120 is a set-top box terminal, the second user may use the remote control device, to submit a search query, and the set-top box may then interact with the data center 150 to obtain resulting catalog 600 of search results corresponding to the search query.

From catalog 600, the second user may select a personal channel to view at user terminal 130 (S820). For example, where the second user terminal is a set-top box, the second user may use the remote control device to select one of the personal channel listings displayed in catalog 600. Upon receiving the second user's selection, the personal channel application 240 causes the second user terminal 130 to send a message to the data center 150 requesting viewing of the selected personal channel. The message may include the channel name/identifier.

Data center 150 receives the message from the second user terminal 130, and determines if the second user may access the selected personal channel (S822). In some instances, the second user may be denied access to the personal channel if the second user's personal data in user account database 460 does not meet the predetermined privacy, age rating or other parameters defined by the selected personal channel's associated metadata. If the second user is permitted to access the selected personal channel, data center 150 sends the second user terminal 130 an channel identifier of the selected personal channel, as well as any other information that may be needed to access the personal channel (S825). For example, certain security facilities may be used to ensure the identities and authorization to access user terminals, such as encryption, digital signatures, tokens and keys. This security information may be provided to the second user terminal 130 if needed.

Based on the channel identifier, the second user terminal 130 contacts the first user terminal 110 over network 170 and requests access to the selected personal channel (S830). In response, first user terminal 110 may establish a communication link with the second user terminal 130 (e.g., a streaming media session), and transmit any media content items associated with the selected personal channel to second user terminal 130 (S835). Second user terminal 130 receives the transmission (S840) of media content, and may present it to the second user via the input/output devices 250 associated with the second user terminal 130 (S845). After viewing, second user may be given the opportunity to transmit feedback data to the data center 150 which may be stored in feedback database 450 (S850).

In an alternate implementation, second user may directly access a personal channel at first user terminal 110 based on a known channel identifier. In other words, a second user who knows the identifier of a personal channel in advance may access the first user's personal channels without obtaining the channel identifier or other information from data center 150. In another implementation, the personal channel media content may be stored at data center 150. In such case, second user terminal 130 may access the personal channel directly from data center 150.

Any of the steps of the sequences illustrated in FIGS. 7 and 8 described above are subject to authentication by user identification, keyword and/or cryptographic key. For example, user verification and/or authorization may be required before accessing network terminals 110 and 130, accessing network 170, and/or video messaging controller 150. Furthermore, data stored in memory, storage devices and/or contained in video messages may be encrypted.

Although FIG. 7 and FIG. 8 illustrate the embodiments of the present application in a particular sequence, it will be readily apparent to an artisan that certain steps may occur in a different sequence or concurrently. Furthermore, it will be will be apparent to an artisan that certain steps may be divided into a plurality of steps, or combined in to a single step.

Finally, it will be apparent to an artisan the additional steps may be inserted amongst the list steps of the exemplary processes.

CONCLUSION

For purposes of explanation only, certain preferred embodiments of the present invention are described herein with reference to the components illustrated in FIGS. 1-8. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments. Also, the processes described herein are not inherently related to any particular apparatus and may be implemented by any suitable combination of components.

The foregoing description of possible implementations consistent with the present invention (as recited in the appended claims) does not represent a comprehensive list of all such implementations or all variations of the implementations described. The description of only some implementation should not be construed as an intent to exclude other implementations. Artisans will understand how to implement the invention as recited in the appended claims in many other ways, using equivalents and alternatives that do not depart from the scope of the following claims. Moreover, unless indicated to the contrary in the preceding description, none of the components described in the implementations are essential to the invention.

What is claimed is:

1. A method implemented by a first user terminal associated with a first user, the method comprising:
    storing at least one media content item at the first user terminal;
    storing information for a personal channel at the first user terminal, where the information is associated with the at least one media content item;
    transmitting the information for the personal channel to a data center;
    receiving, from a second user terminal associated with a second user, a request for access to the personal channel, the request being transmitted by the second user terminal to the first user terminal, provided that the data center determines that the second user terminal is permitted to access the personal channel;
    retrieving the at least one media content item associated with the personal channel;
    establishing a direct communication link between the first user terminal associated with the first user and the second user terminal associated with the second user; and
    transmitting the at least one media content item associated with the personal channel from the first user terminal associated with the first user over the established direct communication link to the second user terminal associated with the second user.

2. The method of claim 1, further comprising:
    creating the personal channel on the first user terminal, including:
    associating the at least one media content item stored in the first user terminal with the personal channel;
    storing metadata describing the personal channel; and
    providing the metadata to the data center.

3. The method of claim 2, wherein creating the personal channel further includes enabling editing at the first user terminal to edit the at least one media content item.

4. The method of claim 2, wherein associating the at least one media content item includes uploading the media content item from a user device.

5. The method of claim 2, wherein the information for the personal channel defines an audience for the personal channel based on a viewer age rating.

6. The method of claim 1, wherein the first user terminal stores a plurality of personal channels, and wherein each of the plurality of personal channels is associated with a plurality of media content items.

7. The method of claim 1, wherein transmitting the at least one media content item includes one of streaming the at least one media content item in real-time to the second user terminal and transmitting the at least one media content item as a complete file to the second user terminal.

8. The method of claim 1, wherein the request for access to the personal channel is based on a selection from a catalog, the catalog including personal channel metadata identifying a subject, channel name, viewer rating, and number of viewer reviews for the personal channel.

9. The method of claim 8, wherein the catalog is an interactive television programming guide listing personal channels together with broadcast television channels.

10. A non-transitory computer-readable medium storage device storing instructions executable by a first user terminal associated with a first user comprising a processor, the instructions configured to cause the processor to:
    store at least one media content item at the first user terminal;
    store information for a personal channel at the first user terminal, where the information is associated with the at least one media content item;
    transmit the information for the personal channel to a data center;
    receive, from a second user terminal associated with a second user, a request for access to the personal channel, the request being transmitted by the second user terminal to the first user terminal, provided that the data center determines that the second user terminal is permitted to access the personal channel;
    retrieve the at least one media content item associated with the personal channel;
    establish a direct communication link between the first user terminal associated with the first user and the second user terminal associated with the second user; and
    transmit the at least one media content item associated with the personal channel from the first user terminal associated with the first user over the established direct communication link to the second user terminal associated with the second user.

11. A system, comprising:
    a network communicatively coupled to a plurality of user terminals including a first user terminal associated with a first user and a second user terminal associated with a second user; and
    a data center connected to the network and accessible by the plurality of user terminals;
    wherein the data center is configured to:
        receive from the first user terminal a message including personal channel information associated with a personal channel accessible at the first user terminal, the personal channel being associated with at least one media content item, store the personal channel information in a data store including a first user terminal identifier, receive, from the second user terminal, a request for the personal channel information, determine whether the second user terminal is permitted to access the personal channel, based on the personal channel information received from the first user terminal, and provide the personal channel information to the second user terminal in response to the request, when the second user terminal is permitted to access the personal channel, wherein the second user terminal transmits a request to access the personal channel to the first user terminal, and in response, the first user terminal associated with the first user establishes a direct communication link to the second user terminal associated with the second user and transmits the at least one media content item over the established direct communication link to the second user terminal associated with the second user.

12. The system of claim 11, wherein the data center is further configured to:

generate a catalog, the catalog including personal channel metadata identifying a subject, channel name, viewer rating, and number of viewer reviews for the personal channel; and provide the catalog to the second user terminal.

13. The system of claim 12, wherein the catalog is an interactive television programming guide listing personal channels together with broadcast television channels.

14. The system of claim 11, wherein the personal channel information defines an audience for the personal channel based on a viewer age rating.

15. The system of claim 11, wherein the data center is further configured to store information associated with a plurality of personal channels accessible from the plurality of user terminals.

16. A method implemented by a data center, the method comprising:

receiving over a network from a first user terminal associated with a first user a message including personal channel information associated with a personal channel accessible at the first user terminal, the personal channel being associated with at least one media content item;

storing the personal channel information in a data store including a first user terminal identifier;

receiving over the network from a second user terminal associated with a second user a request for the personal channel information;

determining whether the second user terminal is permitted to access the personal channel, based on the personal channel information received from the first user terminal; and providing the personal channel information to the second user terminal in response to the request, when the second user terminal is permitted to access the personal channel, wherein the second user terminal transmits a request to access the personal channel to the first user terminal, and in response, the first user terminal associated with the first user establishes a direct communication link to the second user terminal associated with the second user and transmits the at least one media content item over the established direct communication link to the second user terminal associated with the second user.

17. The method of claim 16, further comprising:

generating a catalog, the catalog including personal channel metadata identifying a subject, channel name, viewer rating, and number of viewer reviews for the personal channel; and providing the catalog to the second user terminal.

18. The method of claim 17, wherein the catalog is an interactive television programming guide listing personal channels together with broadcast television channels.

19. The method of claim 16, wherein the personal channel information defines an audience for the personal channel based on viewer age rating.

20. A non-transitory computer-readable medium storage device storing instructions executable by a data center comprising a processor, the instructions configured to cause the processor to:

receive over a network from a first user terminal associated with a first user a message including personal channel information associated with a personal channel accessible at the first user terminal, the personal channel being associated with at least one media content item;

store the personal channel information in a data store including a first user terminal identifier;

receive over the network from a second user terminal associated with a second user a request for the personal channel information;

determine whether the second user terminal is permitted to access the personal channel, based on the personal channel information received from the first user terminal; and provide the personal channel information to the second user terminal in response to the request, when the second user terminal is permitted to access the personal channel, wherein the second user terminal transmits a request to access the personal channel to the first user terminal, and in response, the first user terminal associated with the first user establishes a direct communication link to the second user terminal associated with the second user and transmits the at least one media content item over the established direct communication link to the second user terminal.

* * * * *